Patented Feb. 4, 1947

2,415,356

UNITED STATES PATENT OFFICE

2,415,356

PLASTICIZER AND SOFTENER FOR PERBUNAN AND PERBUNAN TYPE RUBBERS

Henry B. Kellog, Union City, and George E. Serniuk, Roselle, N. J., assignors, by mesne assignments, to Jasco, Incorporated, a corporation of Louisiana No Drawing. Application December 21, 1940, Serial No. 371,098

4 Claims. (Cl. 260—36)

This invention relates to plasticizers or softeners and to plastic compositions containing them, and relates particularly to processes and materials for the preparation of a new class of plasticizers for rubber and synthetic rubber-like materials.

Many of the recently developed synthetic plastic materials are polymers or interpolymers of diolefins with other polymerizable organic compounds containing one or more double bonds per molecule. These polymers require plasticizers or softeners to render them less difficult to process in the calendering, tubing, and embossing operations, and to render them more plastic for shaping operations prior to curing or vulcanizing.

According to the present invention, natural rubber and synthetic rubber-like materials may be softened and a highly plastic composition obtained by treating or compounding them with organic amides and anilides, including simple and mixed secondary and tertiary amides and N-substituted alkyl, aryl, and naphthenyl amides as represented by the following formula:

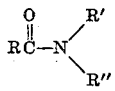

where R is alkyl, aryl, aralkyl or naphthenyl; R' and R" are either hydrogen, alkyl, aryl or naphthenyl groups or acid aliphatic, aromatic, or naphthenic residues and may be alike or unlike.

The amides included within the scope of this invention are substantially water insoluble compounds derived from organic acids by the introduction of the amido group in place of the hydroxyl radical of the carboxylic group:

$$RCOOH \rightarrow RCONH_2$$

These amides are readily prepared by dry distillation of the ammonium salts of fatty acids such as caproic, lauric, myristic, oleic, stearic, palmitic, benzoic, naphthoic, and naphthenic acids:

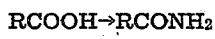

Correspondingly substituted amides can be prepared in a like manner but instead of forming ammonium salts, salts of primary and secondary amines are formed. They may likewise be prepared by the controlled hydrolysis of organic cyanides.

The more useful amides from the standpoint of economy and of speed and ease of preparation are those obtained by rapidly distilling ammonium naphthenate or by saturating naphthenic acids with dry ammonia and then refluxing; or by passing a stream of ammonia through heated naphthenic acids.

The naphthenic acids used for the purpose of the present invention are extraction products of crude petroleum oils or distillates with alkali, that is, the crude acids are recovered by acidifying the alkali sludge from the refining of mineral oils or are those obtained from petroleum fractions containing naphthenic acids of phenols extracted with liquid sulfur dioxide. The term "naphthenic acids" describes the mono cyclic acids or mixtures and also bi-cyclic acids in mixtures with paraffinic acids. With regard to acids of high molecular weight, there are two types, mono cyclic $C_nH_{2n-2}O_2$ and bi-cyclic $C_nH_{2n-4}O_2$. The mono cyclic type comprises in general the acids of 8 to 12 carbon atoms. The bi-cyclic acids contain from 13 to as high as 23 carbon atoms per molecule.

The naphthenic acids present in the lubricating oil portion of a Gulf Coast petroleum, having a molecular weight range of about 220 to 440, corresponding to 14 to 30 carbon atoms per molecule, are also applicable to the preparation of the naphthenic acid amides of the present invention. These high molecular weight acids are obtained after distilling gasoline and gas oil in the conventional manner from Gulf Coast crude, the reduced crude being distilled from sodium hydroxide to obtain the lubricating oil fraction. The corresponding naphthenic acids retained in the residue from this distillation as naphthenates are liberated and separated to give a commercial product. Since naphthenic acids occur to some extent in practically all crude petroleums, or their distillates, the term "naphthenic acid" used in describing the preparation of the naphthenic acid amides is intended to refer to any naphthenic acid regardless of the source from which it is obtained since they are all effective in preparing the acid amides and anilides of the present invention. It is to be understood that even though it is impossible to isolate individual acids, nevertheless, comparisons of mixtures of the same boiling range and of their degradation products by the amine-olefin; or the progressive degradation, method; indicate their similarity in properties and constitution. Similarly, oxy-naphthenic or hydroxy-carboxylic naphthenic acids obtained by oxidation of petroleum distillate fractions or mixtures thereof may be used. The oxy-naphthenic acid products correspond approximately to the empirical formulae:

$C_{12}H_{20}O_3$, $C_{13}H_{23}O_3$ and $C_{14}H_{25}O_5$

The naphthenic acid amides and anilides used in the preparation of plasticizers and softening agents, disclosed in this invention, may be prepared from either low viscosity naphthenic acids such as are recoverable from kerosene distillates and light lubricating oils, or from the high viscosity acids which are recovered from highly viscous lubricating oil distillates. The desired amides may be prepared by the dry distillation of the ammonium salts or by adding the acid chloride to chilled concentrated aqueous ammonia or solid ammonium carbonate.

The following example will illustrate how this invention may be carried out, but the invention is not restricted to this example. Since the naphthenic acid amide could be prepared quickly by the well-known method in the art of reacting the acid chloride with chilled concentrated aqueous ammonia, this procedure was resorted to.

Example I

The naphthenic acids used in the present embodiment of the invention were obtained from Columbian crude oil and were extracted from the gas oil with dilute sodium hydroxide and recovered from the alkaline solution by acidification with sulfuric acid. After washing with water to remove mineral acids and salts, a naphthenic acid was obtained which had the following typical analysis:

| | |
|---|---|
| Sp. Gr. (° A. P. I.) | 15.7 (0.961) |
| Acid No | 202 |
| Saponification No | 208 |
| Unsaponified material | 13.5 |

The crude acid was then vacuum distilled to produce a 234–235 acid number and 10–88% heart cut.

Naphthenic acids of any desired molecular weight can be converted into the acid chloride by reacting the acids with thionyl chloride or phosphorous trichloride in the usual way. The acid chloride is sufficiently stable to allow purification by distillation.

The parts in this example are by weight:

229 gms. (1 mol) of naphthenic acid chloride were added gradually to a large excess (500 cc.) of $NH_4OH$ which was chilled in a dry ice-acetone bath. Upon addition of the acid chloride a white insoluble mass separated from the aqueous solution. The dry ice-acetone bath was removed and the reaction mixture was allowed to warm up to room temperature. The grease-like mass was then separated from the aqueous layer by filtration. The mass was then taken up in ether, washed with water, dried over sodium sulfate, filtered and the solvent (ether) removed by distillation. The amide thereby obtained was a solid and possessed a characteristic amide odor, and was water insoluble.

In this example a rubber-like material was selected which was difficult to plasticize. This material, known to the trade as "Perbunan" (an emulsion interpolymer of butadiene and acrylonitrile), cannot be plasticized by treatment with hot air to produce a worthwhile improvement in its working properties. It is, therefore, necessary to mill the Perbunan in order to plasticize it before compounding. This preliminary milling or break-down does not produce the same visible effect that milling of natural rubber does. Nevertheless, this break-down of Perbunan is most important for its further processing.

The following example illustrates the application of the present invention when employing the organic acid amides as compounding ingredients in natural rubber or synthetic rubber-like materials.

Example II

Samples of the Perbunan stock were divided into three portions. One was used as the blank or control, the second had fifteen grams of naphthenic acid amide incorporated into 100 grams of the stock, in the third portion, fifteen grams of a commercially available and widely used plasticizer, known as "Barrett No. 10" which is a commercial coal tar phenol, was incorporated in order to make a comparison of the plasticity improvement.

In comparing the plasticity of the naphthenic acid amide with the commercially available plasticizer, a Williams plastometer (Williams, Ind. and Eng. Chem. 16, 362, 1924) was maintained at a constant temperature (80° C.) in an oven. A fifty gram portion of the above treated Perbunan stock was milled on 6" x 12" rolls set 0.008" apart and maintained at 120° F. by means of circulating water. The time of milling was five minutes. After a rest of 24 hours ⅝" diameter cylinders were cut from the sheets and super-imposed to form laminated cylinders of 2 cc. (weighed) volume. The samples so prepared were preheated for fifteen minutes at 80° C. and then placed between the parallel plates of a Williams plastometer maintained at 80° C. A five kg. force was allowed to act on the sample for three minutes after which the thickness of the sample in thousandths of an inch was read as plasticity. This figure called the "flow number" was represented by the reduction in thickness of the pellet measured in ¹⁄₁₀₀ mm. produced by three minutes' exposure to the plastometer load of 5,000 grams.

The pellets were then immediately removed from the plastometer and allowed to rest for one minute at room temperature after which the recovered thickness was measured by means of a Randall-Stickney gauge reading in ¹⁄₁₀₀ mm. The increase in thickness of the deformed pellets on cooling is called the "recovery."

The thickness of the pellets on compression are taken as a measure of the plasticity while the recovery is indicative of the plastic elastic properties of the stock.

The results set forth in the following table were obtained from samples of the Perbunan stock as above described:

| | Plasticity | Recovery |
|---|---|---|
| Blank (control) | 216 | 61 |
| Barrett No. 10 (a phenolic coal tar derivative) | 178 | 30 |
| Naphthenic acid amide | 170 | 21 |

Example III

In order to ascertain whether the naphthenic acid amide had any deleterious or adverse effects upon the rubber stock after curing, the synthetic rubber-like polymer used in Example 2 was compounded as follows:

| | Parts |
|---|---|
| Perbunan (butadiene-acrylonitrile emulsion polymer) | 100 |
| Naphthenic acid amide | 15 |
| Zinc oxide | 5 |
| Carbon black | 45 |
| Stearic acid | 1½ |
| Sulfur | 2 |
| Santocure (condensation product of mercapto benzo thiozol with cyclo hexyl amine) | ⅝ |
| D. P. G. (diphenyl guanidine) | ⅝ |

This composition was segregated into four equal portions and cured at 287 F. for fifteen, thirty, forty-five and sixty minutes, respectively. After curing the product did not show any blistering or any adverse or deleterious effects.

Where ease of milling and calendering is desired it is well to use a particular percentage of organic acid amides. The use of 2 or 3% to 15% of such amides in any ordinary batch will permit of much easier milling conditions. The organic acid amides of the present invention will impart softness and free milling conditions and can be used for that purpose. They are perfectly satisfactory in white stocks and can be used in amounts as high as 15 to 20% of the rubber, particularly in sponge stocks where it is necessary to plasticize and soften the stock very thoroughly.

The amides of the present invention possess remarkable solvent properties for and in a large number of plastics, as they contain a high degree of naphthenicity which is very beneficial in producing plasticizing and softening properties. They are of relatively high boiling point, great stability and of high resistance to heat, which is of importance when they are used with plastics of the heat-hardening type.

Example IV

The naphthenic acid amides of the present invention are condensation products of naphthenic acid chlorides, with alkyl, aryl, aralkyl and naphthyl amines. A convenient process for their preparation utilizes for the raw material, a mixture of the naphthenic acid chlorides as above described. Equimolecular proportions of the naphthenic acid chlorides and a corresponding amine were condensed according to the following reaction:

1.
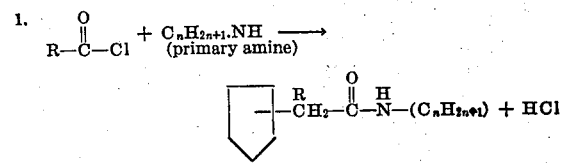

2.
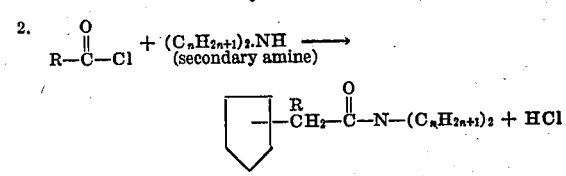

Alternatively, the desired anilides were produced by a similar reaction using an aryl amine as indicated in the following formulae:

3.
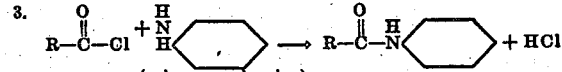
(primary aryl amine)

4.
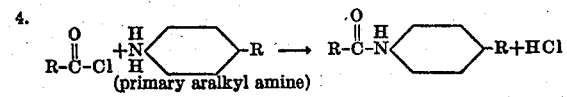
(primary aralkyl amine)

where R = alkyl from 1 to 20 carbon atoms.

5.
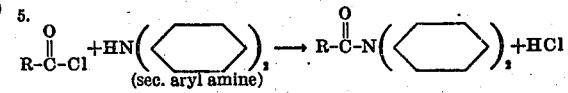
(sec. aryl amine)

The desired naphthenic acid anilides were also obtained from a substituted aryl amine according to the following reaction:

6.
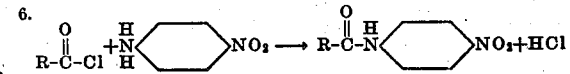

7.
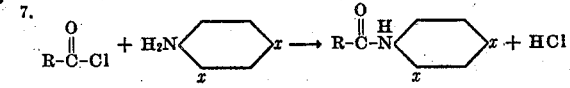

where $x$ = halogen, $NO_2$, etc.

The desired naphthenic acid anilides were also obtained from naphthylamine by a reaction shown in the following formula:

8.
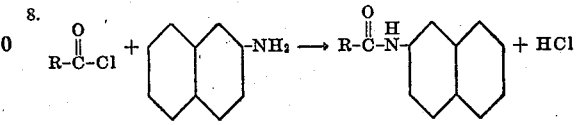

Similarly, highly desirable and advantageous compounds were obtained by the reaction of naphthenic acid chlorides in condensation with high moleculiar weight mercaptans yielding thioesters according to the following reaction:

9.
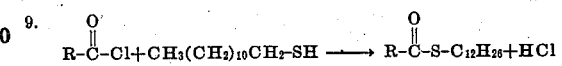

10. Similar reactions occurred with such substances as piperidine

with pyroles, in either the alpha or beta substituted form; or with carbazole

11. The organic acid amides of the present invention may also be reacted with compounds capable of replacing the H of the amido radial as for example

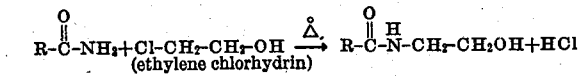
(ethylene chlorhydrin)

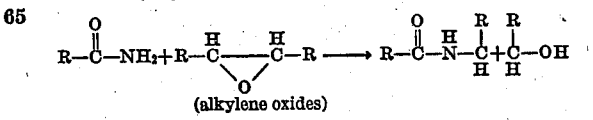
(alkylene oxides)

wherein R represents hydrogen or alkyl groups.

In comparing the plasticity of the above anilides with the corresponding amides, the anilides indicated a similar measure of plasticity. As in the case of the amides, the anilides can be used in 2 or 5% to 15 or 20% in any ordinary batch for easier milling conditions. The anilides of the present invention possess somewhat similar solvent properties to the amides for and in a large number of plastics since they in some instances contain a higher degree of naphthenicity which is very beneficial in producing plasticizing and softening effects not only in natural or syntheic rubbers, but in various plastics and resins.

While the plasticizers of the present invention are applicable to plastic substances in general, they are particularly effective with phenol formaldehyde and phenol furfural resins, polyhydric alcohol-polybasic acid resins, condensation products of urea and formaldehyde, polymerized indene-coumarone resins, polymerized resins from styrol, polyvinyl acetal resins, etc. Among the polyvinyl acetal resins with which organic acid amides and anilides are useful may be mentioned, the polyvinyl formaldehyde acetal resins, the polyvinyl acetaldehyde acetal resins, the polyvinyl formaldehyde acetaldehyde mixed acetal resins, the polyvinyl butyraldehyde acetal resins, and the polyvinyl butyraldehyde acetaldehyde mixed acetal resins. Compositions containing natural resins such as shellac, copal, dammar, and the like, may also be effectively plasticized by means of the organic acid amides and anilides.

The amides and anilides of the present invention may also be used in the treatment of rubber, both natural and synthetic, and for other elastic plastic polymers to retard deterioration thereof and particularly as age resisters or antioxidants in rubber and similar materials in order to increase the useful life of such materials. They can be effectively used for such a purpose in amounts ranging from 2 or 3% to as high as 5%.

In particular, the naphthenic acid amides and anilides according to the invention are effective as valuable plasticizers for polyvinyl chloride which is very hard at room temperature, since it is effectively plasticized by reducing and eliminating the brittleness of the polyvinyl chloride. When polyvinyl chloride and the amides or anilides in proper proportions are milled together on rubber compounding rolls, a pliable rubber-like material is formed without brittleness and without the tendency to shatter at low temperatures.

In view of the excellent plasticizing effect of the naphthenic acid amides, they are not only valuable in plasticizing rubber or synthetic rubber-like masses, but are equally valuable in the reclamation of vulcanized rubber or synthetic rubber-like materials. The naphthenic acid amides of the present invention can be effectively utilized in the devulcanization of the plasticized reclaimed rubber and dissolved to obtain a reclaimed rubber product possessing characteristics of the original rubber or rubber-like material prior to vulcanization.

The plasticizing effect of these naphthenic acid amides and anilides is not limited to rubber or rubber-like substances, but extends to various other solid substances; particularly, they are especially valuable as plasticizers for facilitating the preparation of solid coherent masses of naphthalene per se for such uses as moth balls and other similar substances and uses. It is found that a mixture of naphthalene with from 1 to 5, 10 or 15% of the naphthenic acid amides or anilides produces a composition which is particularly easy to mold into coherent granules or solid masses, without noticeable reduction of the vapor pressure of the naphthalene.

By the process and product of the present invention, there is thus produced a series of compounds of especial value for plasticizing or softening rubber, synthetic rubber, synthetic resins and similar compositions requiring plasticization and a series of plasticized rubbery compositions.

While there are above disclosed but a limited number of embodiments of the invention, it is possible to produce still other embodiments without departing from their inventive concept herein disclosed, and it is, therefore, desired that only such limitations be imposed upon the appended claims as are stated therein or required by the prior art.

We claim:
1. A plasticized composition comprising butadiene-acrylonitrile interpolymer and a naphthenic acid amide.
2. A plasticized composition comprising butadiene-acrylonitrile interpolymer and a naphthenic acid anilide.
3. A butadiene-acrylonitrile interpolymer plasticized with an amide of the cyclic naphthenic acids, which acids contain from 8 to 30 carbon atoms.
4. In the processing of a butadiene-acrylonitrile interpolymer to plasticize and improve the properties thereof, the steps in combination of incorporating into such interpolymer from 2% to 20% of an amide of the cyclic naphthenic acids, which acids contain from 8 to 30 carbon atoms, and thereafter heating the mixture to vulcanizing temperature.

HENRY B. KELLOG.
GEORGE E. SERNIUK.

REFERENCES CITED

The following references are of record in the file of this patent:

UNITED STATES PATENTS

| Number | Name | Date |
|---|---|---|
| 2,018,643 | Williams | June 16, 1934 |
| 2,202,363 | Wiezevich | May 28, 1940 |
| 1,986,854 | Reid | Jan. 8, 1935 |
| 2,109,941 | D'Alelio | Mar. 1, 1938 |
| 2,126,019 | Kirkpatrick | Aug. 9, 1938 |
| 2,198,970 | Muller | Apr. 30, 1940 |
| 2,300,587 | Menger | Nov. 3, 1942 |
| Re. 20,845 | Charch | Sept. 6, 1938 |
| 2,070,991 | Hund | Feb. 16, 1937 |